(12) United States Patent
Sugimoto et al.

(10) Patent No.: US 7,295,241 B2
(45) Date of Patent: Nov. 13, 2007

(54) IMAGE CAPTURING APPARATUS, IMAGE CAPTURING METHOD, AND COMPUTER-READABLE MEDIUM STORING A PROGRAM FOR AN IMAGE CAPTURING APPARATUS

(75) Inventors: Masahiko Sugimoto, Saitama (JP); Kazuhiko Takemura, Saitama (JP); Hiroshi Fukuda, Saitama (JP); Koichi Sakamoto, Saitama (JP); Atsuhiko Ishihara, Saitama (JP)

(73) Assignee: Fujifilm Corporation, Kanagawa (JP)

( * ) Notice: Subject to any disclaimer, the term of this patent is extended or adjusted under 35 U.S.C. 154(b) by 647 days.

(21) Appl. No.: 10/329,820

(22) Filed: Dec. 27, 2002

(65) Prior Publication Data

US 2003/0122956 A1    Jul. 3, 2003

(30) Foreign Application Priority Data

Dec. 27, 2001    (JP) ............... 2001-398222

(51) Int. Cl.
*H04N 5/225* (2006.01)
*H04N 5/235* (2006.01)
*G03B 7/00* (2006.01)

(52) U.S. Cl. ............... 348/340; 348/229.1; 348/362

(58) Field of Classification Search ............... 348/340, 348/366, 362–363, 364, 349, 370, 229.1; 359/619; 257/294
See application file for complete search history.

(56) References Cited

U.S. PATENT DOCUMENTS 5,682,203 A * 10/1997 Kato ............... 348/340

| | | | |
|---|---|---|---|
| 6,577,821 B2 * | 6/2003 | Malloy Desormeaux | .... 396/374 |
| 6,765,619 B1 * | 7/2004 | Deng et al. | ........ 348/362 |
| 6,884,985 B2 * | 4/2005 | Raynor | ........ 250/208.1 |
| 2002/0008771 A1 * | 1/2002 | Uchino et al. | ........ 348/362 |
| 2002/0140835 A1 * | 10/2002 | Silverstein | ........ 348/340 |
| 2003/0052991 A1 * | 3/2003 | Stavely et al. | ........ 348/370 |
| 2003/0095192 A1 * | 5/2003 | Horiuchi | ........ 348/222.1 |
| 2003/0122956 A1 | 7/2003 | Sugimoto et al. | |

FOREIGN PATENT DOCUMENTS

| JP | 05-227468 | 9/1993 |
|---|---|---|
| JP | 5-260391 A | 10/1993 |
| JP | 09-186930 A | 7/1997 |
| JP | 10-062609 | 3/1998 |
| JP | 10-191181 A | 7/1998 |
| JP | 11-32242 A | 2/1999 |
| JP | 2000-092383 A | 3/2000 |

* cited by examiner

*Primary Examiner*—Ngoc-Yen Vu
*Assistant Examiner*—Gregory V Madden
(74) *Attorney, Agent, or Firm*—Birch, Stewart, Kolasch & Birch, LLP

(57) ABSTRACT

An image capturing apparatus for acquiring images having high dynamic range. The image capturing apparatus includes CCD consisting of a first photo detector for detecting light from central area of a subject, a second photo detector for detecting light from marginal area of the subject, a photometry sensor for measuring brightness of the central and the marginal areas of the subject, and a sensitivity control unit for controlling sensitivity of the first photo detector based on the brightness of the central area measured by the photometry sensor and controlling sensitivity of the second photo detector based on the brightness of the marginal area measured by the photometry sensor.

16 Claims, 13 Drawing Sheets

212a

214b

220

IMAGE CAPTURING APPARATUS, IMAGE CAPTURING METHOD, AND COMPUTER-READABLE MEDIUM STORING A PROGRAM FOR AN IMAGE CAPTURING APPARATUS

This patent application claims priority under 35 U.S.C. §119 to Japanese patent application, 2001-398222 filed on Dec. 27, 2001, the contents of which are incorporated herein by reference.

BACKGROUND OF THE INVENTION

1. Field of the Invention

The present invention relates to an image capturing apparatus, an image capturing method, and a computer-readable medium storing program. More particularly, the present invention relates to an image capturing apparatus which obtains images having high dynamic range.

2. Description of Related Art

Image capturing apparatuses, such as digital cameras and video cameras, obtain an image by converting an optical image of a subject into an electrical signal by image sensing devices, such as CCD and MOS. However, the dynamic range of these image sensing devices is remarkably lower than dynamic range that exists in real life. Consequently, a conventional image capturing apparatus adjusts optical information of a main subject within the dynamic range of the image sensing devices to obtain an image using an optical stop, an electronic shutter and the like. For this reason, when a subject includes an area having high dynamic range, there has been a problem that the conventional image capturing apparatus can obtain only images that ranges from a predetermined brightness to a predetermined darkness.

A Japanese patent application publication No. 11-32242 discloses an image capturing apparatus which generates images with high dynamic range by compounding signals acquired by a plurality of CCDs having different sensitivity. Also, a Japanese patent application publication No. 5-260391 discloses an image capturing apparatus, where the image capturing apparatus is adapted to increase the amount of charges by reading charge pattern accumulated in CCD for multiple times so that the dynamic range of the image is expanded.

However, since the image capturing apparatus disclosed in the Japanese patent application publication No. 11-32242 requires optics, such as a plurality of CCDs and a beam splitter, large-size and high-cost of the apparatus cannot be avoided. Moreover, in the image capturing apparatus disclosed in the Japanese patent application publication No. 5-260391, although the amount of charge transfer from the CCD can be increased, the dynamic range cannot be expanded unless increase of the amount of charge storages is accomplished.

SUMMARY OF THE INVENTION

Therefore, it is an object of the present invention to provide an image capturing apparatus, an image capturing method, and a computer-readable medium storing program which can solve the foregoing problem. The above and other subjects can be achieved by combinations described in the independent claims. The dependent claims define further advantageous and exemplary combinations of the present invention.

According to the first aspect of the present invention, there is provided an image capturing apparatus for capturing a subject. The image capturing apparatus includes an image sensing device including a first photo detector for detecting light of a first area of the subject, and a second photo detector for detecting light of a second area of the subject; a brightness measuring unit for measuring brightness of the first area, and brightness of the second area; and a sensitivity control unit for controlling sensitivity of the first photo detector based on the brightness of the first area measured by the brightness measuring unit, and controlling sensitivity of the second photo detector based on the brightness of the second area measured by the brightness measuring unit.

The first photo detector may include a first micro lens for condensing light and a first exposure unit for detecting the light condensed by the first micro lens. The second photo detector may include a second micro lens for condensing light and a second exposure unit for detecting the light condensed by the second micro lens. The sensitivity control unit may control relative position between the first micro lens and the first exposure unit based on the brightness of the first area measured by the brightness measuring unit, and may control relative position between the second micro lens and the second exposure unit based on the brightness of the second area measured by the brightness measuring unit.

The sensitivity control unit may control focal length of the first micro lens based on the brightness of the first area measured by the brightness measuring unit, and may control focal length of the second micro lens based on the brightness of the second area measured by the brightness measuring unit.

According to the second aspect of the present invention, there is provided an image capturing apparatus for capturing a subject. The image capturing apparatus includes an image sensing device including a first photo detector for detecting light from a first area in the subject, and converting the light having first intensity into an electrical signal having first intensity; and a second photo detector for detecting light from a second area in the subject, which is different from the first area, and converting the light having second intensity into an electrical signal having second intensity, the light being not converted by the first photo detector, where the first and the second photo detectors are positioned on the same semiconductor substrate.

The image sensing device may include a plurality of the first photo detectors adjoining mutually, and a plurality of the second photo detectors adjoining mutually, which are located outside of the plurality of first photo detectors in an exposure area of the image sensing device.

The first photo detector may include a first exposure unit and a first micro lens, where a proportion of light irradiated on the first exposure unit to light irradiated on the first photo detector is defined as a first proportion, and the second photo detector may includes a second exposure unit and a second micro lens, where a proportion of light irradiated on the second exposure unit to light irradiated on the second photo detector is defined as a second proportion.

A relative position between the first exposure unit and the first micro lens may be different from a relative position between the second exposure unit and the second micro lens. A focal length of the first micro lens may be different from a focal length of the second micro lens.

According to the third aspect of the present invention, there is provided an image capturing apparatus for capturing a subject. The image capturing apparatus includes an electric flash; an image pick-up unit for capturing a first image of the subject using the electric flash flashing at a first flash condition, and for capturing a second image of the subject using the electric flash flashing at a second flash condition;

and an image generation unit for generating a third image based on the first image and the second image.

The image generation unit may generate the third image by trimming and extracting a first partial image, which is a part of the first image indicating a first area of the subject, and a second partial image, which is apart of the second image indicating a second area of the subject, and superimposing the first partial image and the second partial image. The first flash condition may be a condition for suppressing flash of the electric flash, and the second flash condition maybe a condition for forcing flash of the electric flash.

According to the fourth aspect of the present invention, there is provided an image capturing method for capturing a subject. The image capturing method includes steps of detecting light of a first area of the subject by a first photo detector; detecting light of a second area of the subject by a second photo detector; measuring brightness of the first area, and brightness of the second area; and controlling sensitivity of the first photo detector based on the brightness of the first area measured in the brightness measuring step, and controlling sensitivity of the second photo detector based on the brightness of the second area measured in the brightness measuring step.

According to the fifth aspect of the present invention, there is provided an image capturing method for capturing a subject. The image capturing method includes steps of capturing a first image of the subject using an electric flash flashing at a first flash condition; capturing a second image of the subject using the electric flash flashing at a second flash condition; and generating a third image based on the first image and the second image.

According to the sixth aspect of the present invention, there is provided a computer readable medium storing thereon a program for an image capturing apparatus which captures a subject. The program includes a brightness measuring module for allowing the image capturing apparatus to measure brightness of a first area and brightness of a second area; and a sensitivity control module for allowing the image capturing apparatus to control sensitivity of a first photo detector for detecting light from the first area based on the brightness of the first area measured by the brightness measuring module, and to control sensitivity of a second photo detector for detecting light from the second area based on the brightness of the second area measured by the brightness measuring module.

According to the seventh aspect of the present invention, there is provided a computer readable medium storing thereon a program for an image capturing apparatus which captures a subject. The program includes an image pick-up module for allowing the image capturing apparatus to capture a first image of the subject using an electric flash flashing at a first flash condition, and to capture a second image of the subject using the electric flash flashing at a second flash condition; and an image generation module for allowing the image capturing apparatus to generate a third image based on the first image and the second image.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
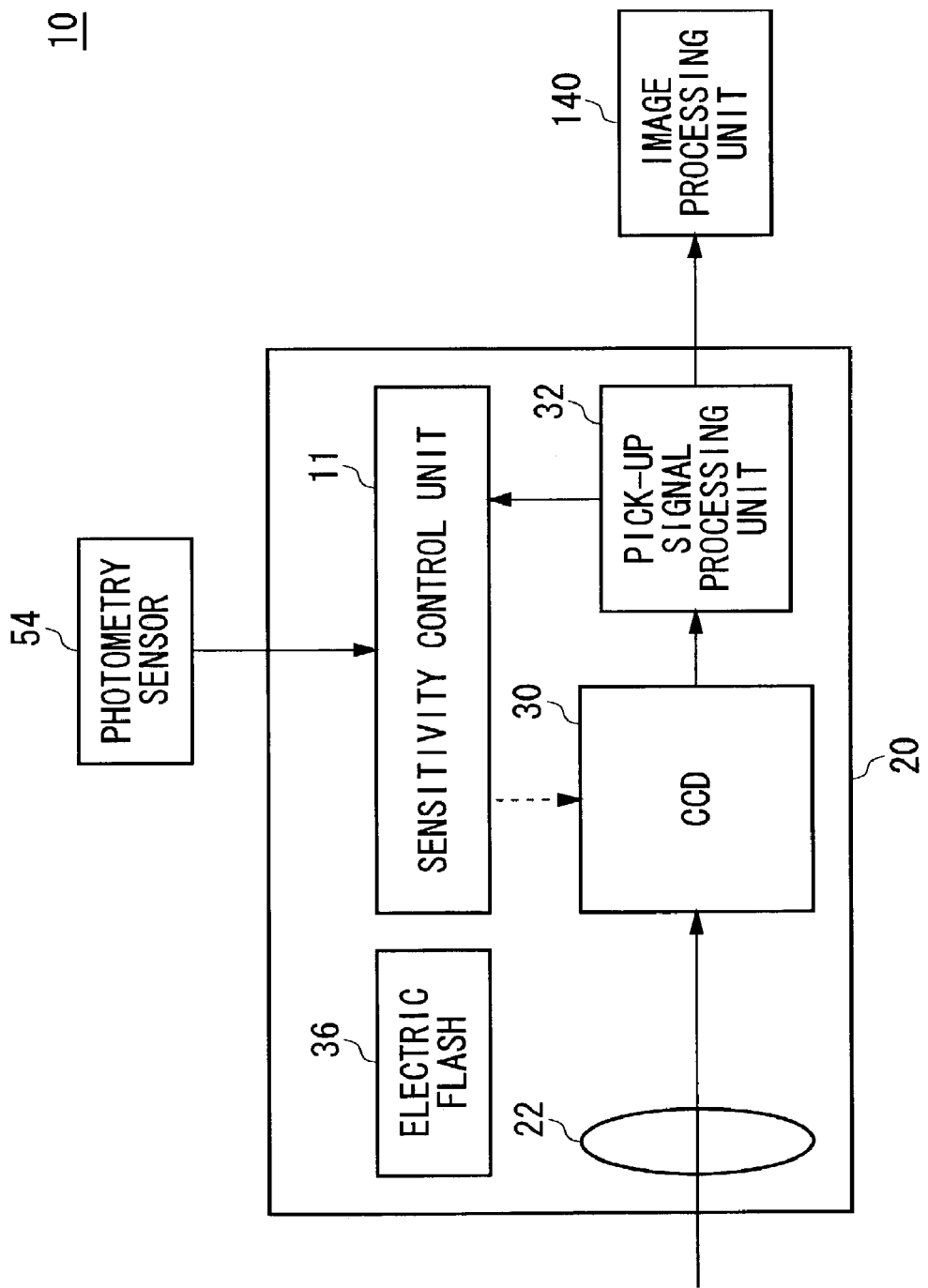
FIG. 1 is a block diagram showing a functional configuration of a digital camera according to an embodiment of the present invention.

FIG. 1 is a block diagram showing a functional configuration of a digital camera 10 according to an embodiment of the present invention. The digital camera 10 is an example of the image capturing apparatus of the present invention. The image capturing apparatus may be a digital still camera which photographs a still image, and may be a digital camcorder which takes movies. The digital camera 10 includes a photometry sensor 54 which is an example of a brightness measuring unit for measuring brightness of an area included in a subject, an image pick-up unit 20 for capturing a subject and acquiring image pick-up data, and an image processing unit 140 for performing image processing on the image pick-up data acquired by the image pick-up unit 20. The image pick-up unit 20 includes an electric flash 36, the taking-lens unit 22 for condensing an optical image of a subject, CCD 30 which is an example of an image sensing device for converting the optical image condensed by the taking-lens unit 22 into an image pick-up signal, a pick-up signal processing unit 32 for processing the image pick-up signal converted by the CCD 30, and a sensitivity control unit 11 for controlling sensitivity of photo detectors which detects light of the above-mentioned area, among photo detectors included in the CCD 30. The image processing unit 140 may have a function as an image generation unit for generating an image based on a plurality of images processed by the pick-up signal processing unit 32. Also, the pick-up signal processing unit 32 may be an example of the brightness measuring unit for measuring brightness of the area included in the subject.

When the digital camera 10 captures a subject, the pick-up signal processing unit 32 or the photometry sensor 54 measures brightness of the subject at first by detecting an electrical signal outputted by photoelectric conversion of photo diode. The sensitivity control unit 11 controls sensitivity of the CCD 30 based on the brightness of the subject measured by the pick-up signal processing unit 32 or the photometry sensor 54. Next, the electric flash 36 flashes based on the brightness of the subject measured by the pick-up signal processing unit 32 or the photometry sensor 54. Then, the CCD 30 converts the optical image, focused by the taking-lens unit 22, into the electrical signal, and outputs the electrical signal. The pick-up signal processing unit 32 performs A/D conversion of the electrical signal outputted from the CCD 30, and outputs the obtained digital image data. The image processing unit 140 generates an output image by performing image processing on the image data outputted from the pick-up signal processing unit 32 based on predetermined conditions.

Figure 2:
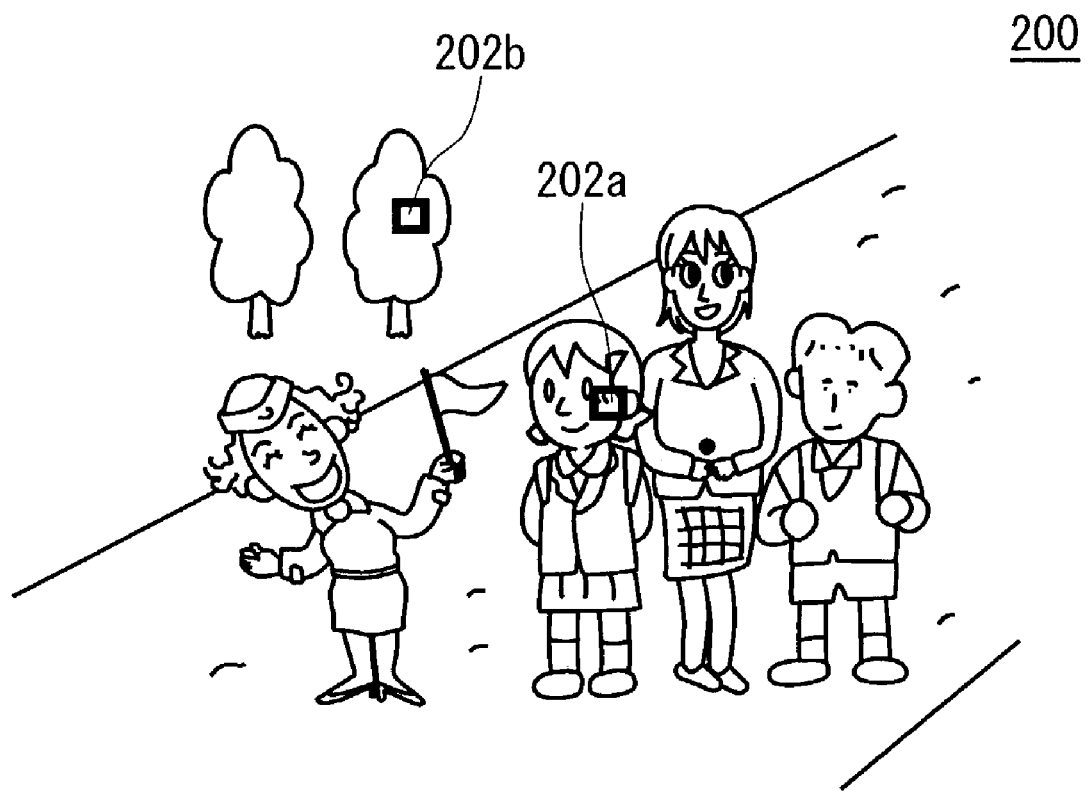
FIG. 2 shows a subject according to the present embodiment.
Figure 3:
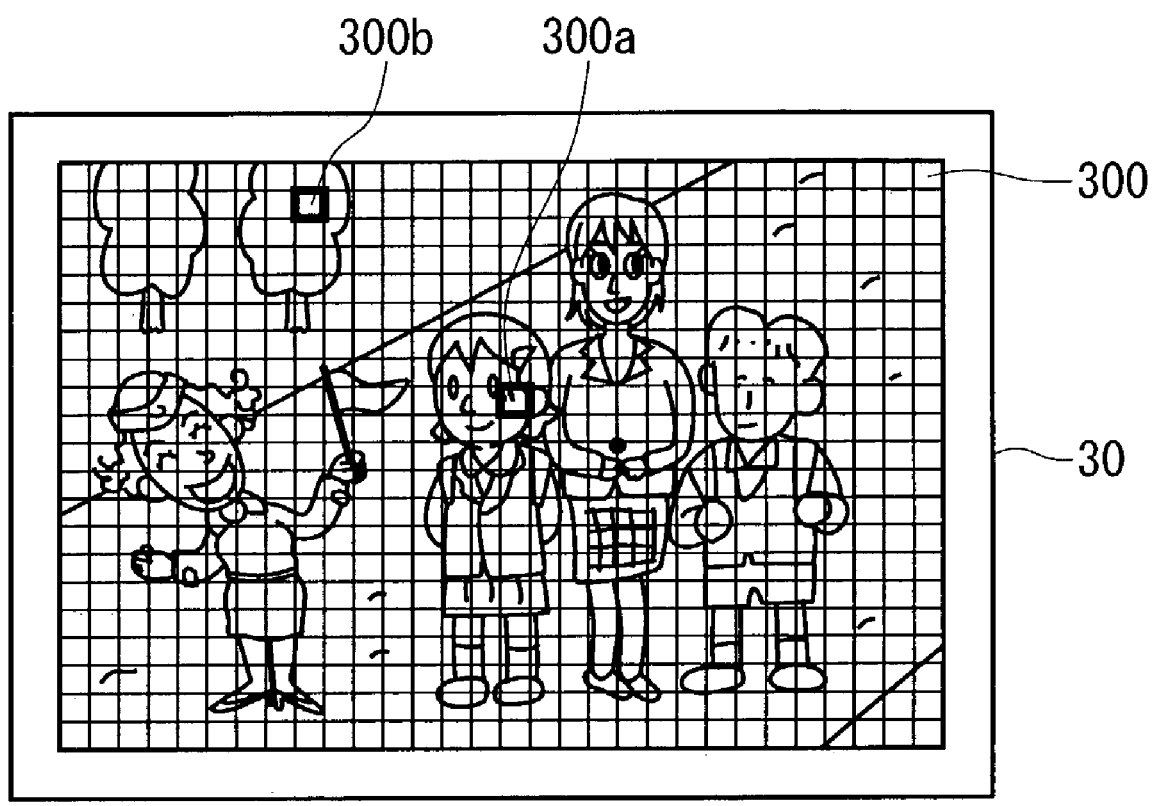
FIG. 3 is an optical image of the subject according to the present embodiment being focused on CCD.

FIG. 2 shows an example of a subject 200 according to the present embodiment. FIG. 3 is an optical image of the subject 200, which is condensed by the taking-lens unit 22 and focused on exposure area of the CCD 30. The subject 200 includes an area 202a and an area 202b. The CCD 30 includes a plurality of photo detectors 300 arranged at equal intervals. The photo detectors 300 include a photo detector 300a for detecting light from the area 202a of the subject 200, and a photo detector 300b for detecting light from the area 200b of the subject 200. When the digital camera 10 captures the subject 200, the pick-up signal processing unit 32 or the photometry sensor 54 measures brightness of the area 202a and the area 202b. In this case, the pick-up signal processing unit 32 or the photometry sensor 54 may measure the brightness of the area 202a or the area 202b for multiple times at different sensitivity. Accordingly, even when the difference between the brightness of the area 202a and the area 202b exceeds the dynamic range of the pick-up signal processing unit 32 or the photometry sensor 54, since appropriate sensitivity is selected for measurement of the brightness of the area 202a and the brightness of the area 202b separately, brightness of the whole subject can be measured appropriately.

Next, the sensitivity control unit 11 controls the sensitivity of the photo detector 300a based on the brightness of the area 202a measured by the pick-up signal processing unit 32 or the photometry sensor 54. The sensitivity control unit 11 also controls the sensitivity of the photo detector 300b based on the brightness of the area 202b measured by the pick-up signal processing unit 32 or the photometry sensor 54. For example, when sunlight reaches the area 202a and does not reach area 202b, the difference between the brightness of the bright area 202a and the dark area 202b tends to exceed the dynamic range of the photo detector 300a and the photo detector 300b. Then, the sensitivity control unit 11 decreases sensitivity of the photo detector 300a to a certain level so that the photo detector 300a can detect the intensity of light of the bright area 202a appropriately. Also, the sensitivity control unit 11 increases sensitivity of the photo detector 300b to a certain level so that the photo detector 300b can detect the intensity of light of the dark area 202b appropriately.

The CCD 30 captures the subject 200 with the sensitivity control unit 11 controlling the sensitivity of the photo detector 300a and the photo detector 300b independently.

Therefore, even when the difference between brightness of the bright area 202a and the dark area 202b is large, the photo detectors 300a and 300b, of which the sensitivities are optimized respectively, can detect brightness of the area 202a and the area 202b appropriately within dynamic range of each of the photo detector, and can convert it into an electrical signal.

In addition, the pick-up signal processing unit 32 acquires the sensitivity level of the photo detector 300a and the photo detector 300b, being controlled by the sensitivity control unit 11, and the electrical signals outputted from the photo detector 300a and the photo detector 300b in association with the sensitivity of the photo detectors respectively. Then, the pick-up signal processing unit 32 amplifies or attenuates the electrical signals outputted from the photo detector 300a and the photo detector 300b based on the sensitivity level of the photo detector 300a and the photo detector 300b being controlled by the sensitivity control unit 11. For example, when the sensitivity control unit 11 decreases the sensitivity of the photo detector 300a to 1/100, the pick-up signal processing unit 32 amplifies the electrical signal outputted from the photo detector 300a 100 times. Alternatively, when the sensitivity control unit 11 increases the sensitivity of the photo detector 300b 50 times, the electrical signal outputted from the photo detector 300b is attenuated to 1/50. Then the image processing unit 140 generates an output image by composing the signals amplified and/or attenuated by the pick-up signal processing unit 32.

According to the digital camera 10, even if the dynamic range of the subject 200 is higher than dynamic range of the photodetectors 300, an optical image of the subject 200 is acquirable as a charge pattern within the dynamic range of the photo detectors 300 by controlling sensitivity of the plurality of photo detectors 300 independently for every areas. In addition, by amplifying or attenuating the electrical signal outputted from each of the photo detectors 300 independently according to the sensitivity level controlled by the sensitivity control unit 11, the output image, having higher dynamic range than that of the photo detectors 300, is obtainable.

According to another example of the CCD 30 of the present embodiment, the CCD 30 may include a photo detector 300a for detecting light from the area 202a and converting it into an electrical signal at a predetermined sensitivity, and a photo detector 300b for detecting light from the area 202b and converting it into an electrical signal, the light not being convertible into an electrical signal by the photo detector 300a. Specifically, the CCD 30 includes a plurality of photo detectors 300a, having relatively low sensitivity, which adjoin mutually at a central part in an exposure area of the CCD 30. Then the CCD 300 further includes a plurality of photo detectors 300b, having higher sensitivity than the photo detectors 300a, which adjoin mutually and are located outside of the photo detectors 300a in the exposure area of the CCD 30.

In order to set the sensitivity of the photo detector 300b higher than that of the photo detector 300a, the photo detector 300a has a micro lens which is adapted so that light irradiated on the photo detector 300a is condensed by an exposure unit of the photo detector 300a at a predetermined rate, and the photo detector 300b has a micro lens which is adapted so that light irradiated on the photo detector 300b is condensed by an exposure unit of photo detector 300b at a rate higher than the photo detector 300a. In other words, condensing efficiency of the micro lens of the photo detector 300b is higher than condensing efficiency of the micro lens of the photo detector 300a. Specifically, relative position between the micro lens and the exposure unit of the photo detector 300a is set differently from that of the photo detector 300b so that optical efficiency of the photo detector 300b becomes higher than the optical efficiency of the photo detector 300a.

According to another means for setting the sensitivity of the photo detector 300b higher than the sensitivity of the photo detector 300a, focal length of the micro lens of the photo detector 300a is set differently from focal length of the micro lens of the photo detector 300b so that optical efficiency of the photo detector 300b becomes higher than the optical efficiency of the photo detector 300a. Specifically, shape of the micro lens and/or refractive indexes of material of the micro lens of the photo detector 300a may be different from those of the photo detector 300b.

According to the digital camera 10 of this example, since the sensitivity of the photo detector 300a, which captures the central part of the screen, is kept low even if the subject 200 is captured using the electric flash 36 with a main subject at the central part of the screen being located relatively at a short distance from the photo detector, overexposure of the main subject is preventable. In addition, since the photo detector 300b with high sensitivity captures a subject located in a marginal part of the screen and at a long distance from the photo detector, where flashlight of the electric flash does not reach easily, the photo detector 300b captures the subject at proper exposure.

Figure 4:
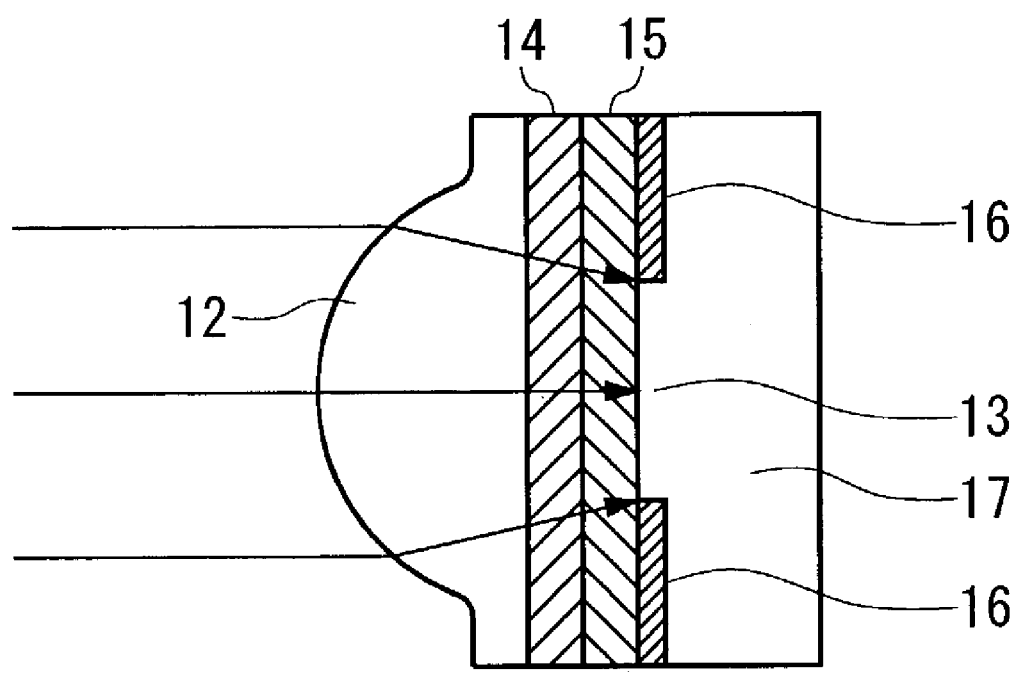
FIG. 4 is a sectional view of an image sensing device according to the present embodiment.

FIG. 4 is an example of a cross section of the photo detector 300 according to the present embodiment. The photo detector 300 includes the semiconductor 17 including a photo diode for converting light into a charge, a shielding layer 16 which consists of aluminum etc., an exposure unit 13 formed from an opening of the shielding layer 16, a micro lens 12 for condensing light, a liquid crystal filter 14 for controlling permeability of the light condensed by the micro lens 12, and a color filter 15. The micro lens 12 has a peculiar focal length determined by a refractive index of material and a shape of the lens.

The micro lens 12 included in the plurality of photo detectors 300 further condenses an optical image once condensed by the taking-lens unit 22. The exposure unit 13 detects the light condensed by the micro lens 12. Then, the semiconductor 17 accumulates charges according to intensity and duration of the light detected by the exposure unit 13. The semiconductor 17 outputs the accumulated charges with predetermined timing. A means, by which the sensitivity control unit 11 controls sensitivity of the photo detector 300, may be the liquid crystal filter 14, or may be an electronic shutter for controlling duration of charge accumulation into the semiconductor 17. The sensitivity of each of the plurality of photo detectors 300 is controllable independently by either the liquid crystal filter 14 or the electronic shutter.

Figure 5A:
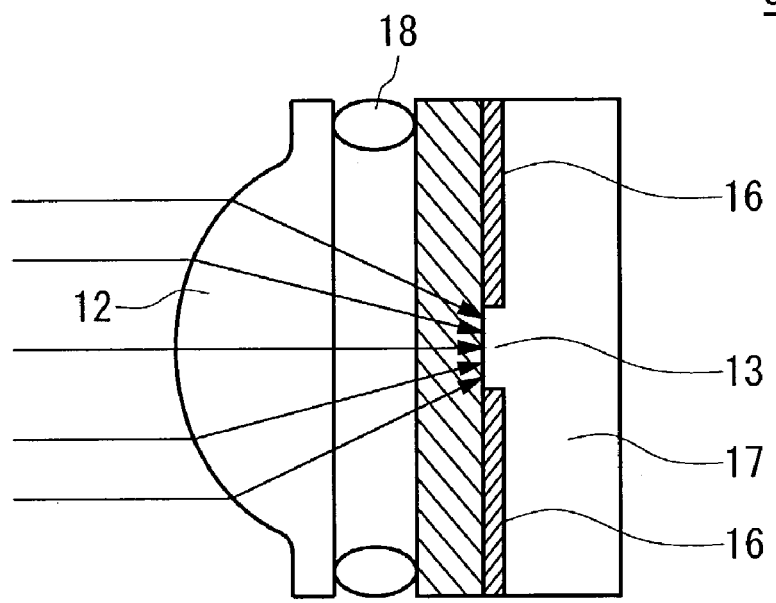
FIGS. 5A and 5B are other examples of the image sensing device according to the present embodiment, showing an actuator is actuating a micro lens.
Figure 5B:
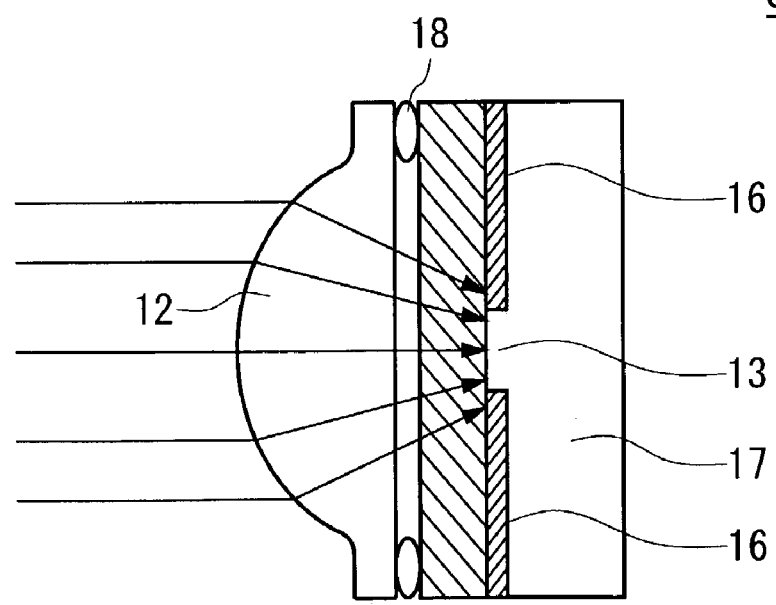

FIGS. 5A and 5B show another example of a cross section of the photo detector 300 according to the present embodiment. The photo detector 300 includes an actuator 18 for changing a relative position between the micro lens 12 and the exposure unit 13. FIG. 5A shows a state that the micro lens 12 is condensing incident light into the exposure unit 13 efficiently. FIG. 5B shows a state that the actuator 18 contracts the distance between the micro lens 12 and the exposure unit 13. If the actuator 18 is to change the position of the micro lens 12 from the position for condensing the incident light into the exposure unit 13 most efficiently as shown in FIG. 5A, to the position shown in FIG. 5B, the intensity of the light irradiated on the exposure unit 13 will decrease. Therefore, the sensitivity control unit 11 can change optical efficiency of the light utilized by the photo detector 300 by actuating the actuator 18 to change the relative position between the micro lens 12 and the exposure unit 13. That is, the sensitivity control unit 11 can control the sensitivity of the photo detector 300 by controlling the relative position between the micro lens 12 and the exposure unit 13 included in the photo detector 300.

Figure 6A:
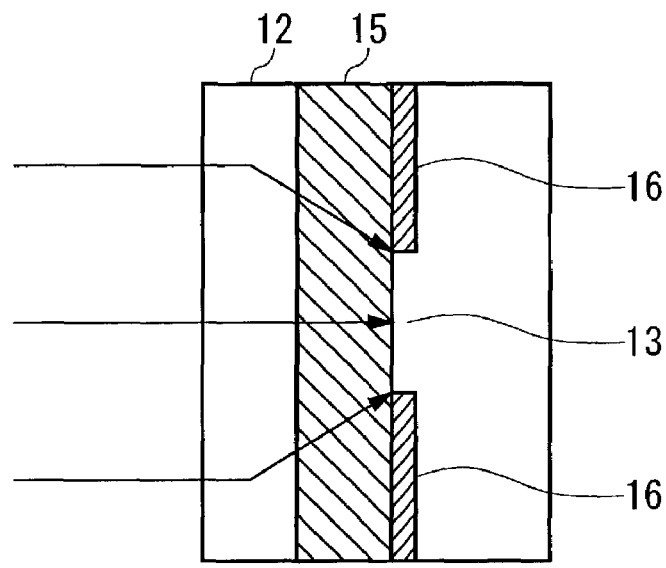
FIGS. 6A and 6B are other examples of the image sensing device according to the present embodiment, showing that a focus of the micro lens is being changed.
Figure 6B:
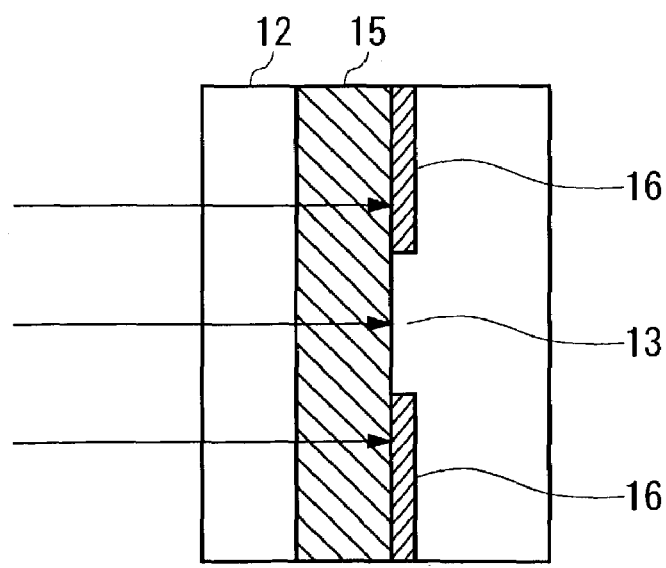

FIGS. 6A and 6B show another example of a cross section of the photo detector 300 according to the present embodiment. The photo detector 300 includes a variable focus lens, such as a liquid crystal lens, as the micro lens 12, and each of the plurality of photo detectors 300 can change focus of the micro lens 12 independently. FIG. 6A shows the state that the micro lens 12 condenses incident light on the exposure unit 13 efficiently. Moreover, FIG. 6B shows the state that refractive index of the micro lens 12 is changed. The refractive index of the micro lens 12 is changed according to voltage applied to the micro lens 12, and rate of incident light condensed on the exposure unit 13 is changed consequently. Therefore, by controlling the voltage applied to the micro lens 12, the sensitivity control unit 11 can control the focal length of the micro lens 12, and can change optical efficiency of the light utilized by the photo detector 300. Thus, the sensitivity control unit 11 can control the sensitivity of the photo detector 300.

Figure 7:
FIG. 7 shows the subject captured by the digital camera according to the present embodiment.

FIG. 7 is an example of a subject 230 captured by another examples of the digital camera 10 according to the present embodiment. The subject 230 includes an area 232 where subjects are located at a relatively short distance, such as a person, and an area 234 where subjects are located in a relatively long distance, such as a background. When the digital camera 10 of this example captures the subject 230, the electric flash 36 determines a plurality of flash conditions having different intensity of the flash, based on distribution of brightness of the subject 230 measured by the pick-up signal processing unit 32 or the photometry sensor 54.

Moreover, the electric flash 36 may determine a plurality of flash conditions based on distance of the subject 230. For example, when the subject 230 includes the area 232, where a bright subject is located at a relatively short distance, the flash condition is set so as not to flash or flash weakly. Alternatively, when the subject 230 further includes the area 234, where a dark subject is located at a relatively long distance, the flash condition is set additionally so as to flash maximally. Then the electric flash 36 flashes in accordance with the plurality of set-up flash conditions, and the CCD 30, which is a part of the image pick-up unit 20, captures each of the images of the subject 230 at each of the plurality of flash conditions respectively.

Figure 8A:
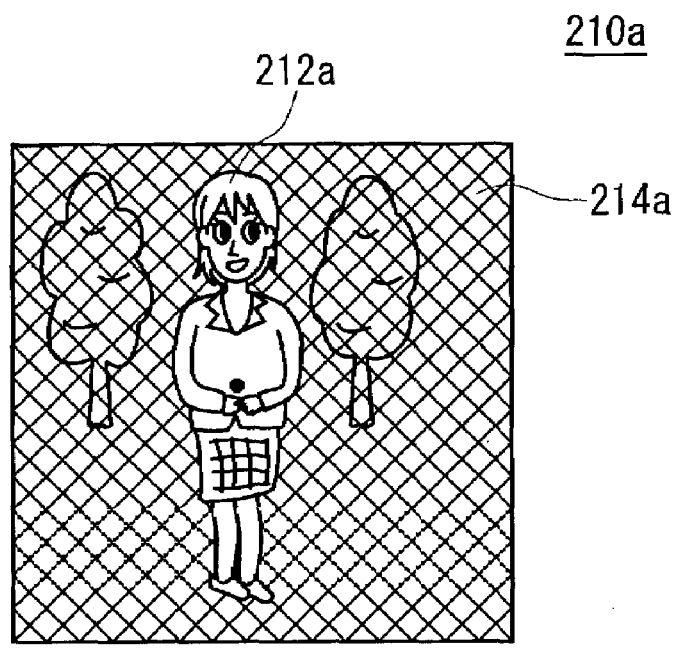
FIGS. 8A and 8B show images of the subject in various flash condition captured by the digital camera according to the present embodiment.
Figure 8B:
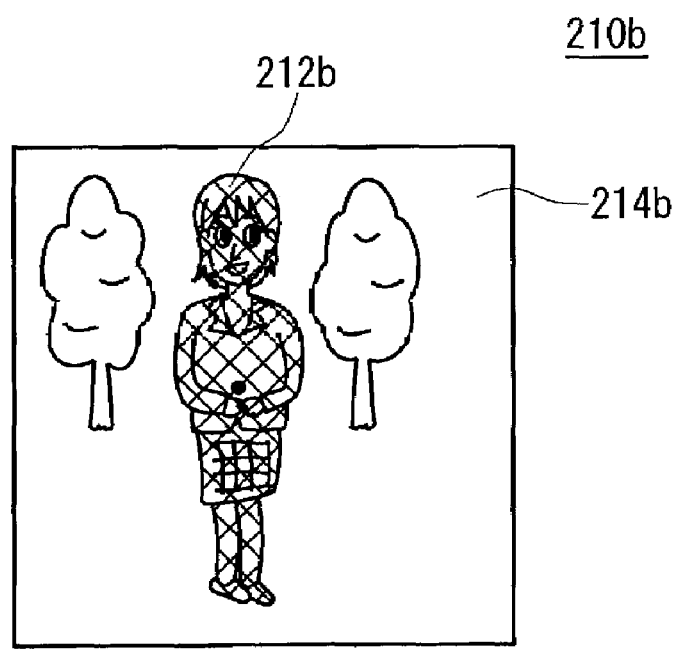

FIGS. 8A and 8B show images in which the image pick-up unit 20 captures the subject 230 in accordance with the plurality of flash conditions of the electric flash 36. FIG. 8A is an original image 210a captured in condition where the electric flash 36 does not flash or flashes weakly. FIG. 8B is an original image 210b captured in condition where the electric flash 36 flashes maximally. When capturing the original image 210a, since the electric flash 36 flashes weakly to optimize the brightness of the area 232 where a subject is located at a relatively short distance, a partial image 212a is captured at optimal exposure. However, intensity of the electric flash 36 for optimizing the brightness of the area 232 cannot fully reach the area 234 where a dark subject is located at a relatively long distance. Therefore, a partial image 214a of the area 234 becomes underexposure.

On the other hand, when capturing the original image 210b, the electric flash 36 flashes at the maximum intensity to reach the area 234 where the dark subject is located at a relatively long distance. Accordingly, a partial image 214b of the area 234 is captured at optimal exposure. However, intensity of the electric flash 36 for optimizing the brightness of the area 234 is too bright for the area 232 where the subject is located at a relatively short distance. Therefore, the partial image 212b of the area 234 becomes overexposure. Then, the image processing unit 140, which is an example of an image generation unit, generates the output image having proper exposure over the whole image from the original image 210a and the original image 210b as follows.

Figure 9A:
FIGS. 9A, 9B and 9C show trimmed images and a superimposed image.
Figure 9B:
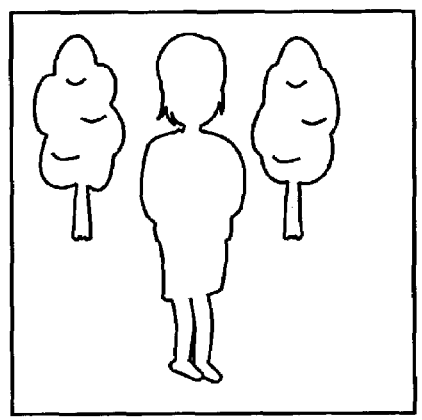
Figure 9C:
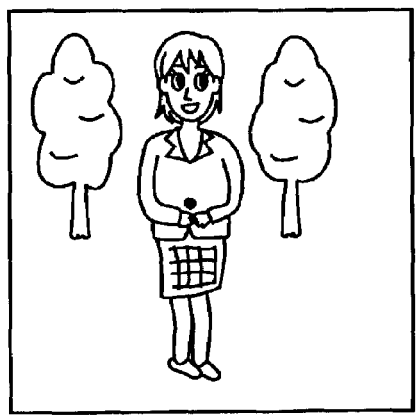

FIGS. 9A, 9B, and 9C show an example of the image processing unit 140 according to the present embodiment for trimming and extracting partial images from the original image 210a and original image 210b and superimposing them. FIG. 9A shows the partial image 212a trimmed and extracted by the image processing unit 140 from the original image 210a, where the area 232 of the subject 230 is captured at optimal exposure level. FIG. 9B shows the partial image 214b trimmed and extracted by the image processing unit 140 from the original image 210b, where the area 234 of the subject 230 is captured at optimal exposure level. FIG. 9C shows an output image 220 generated by the image processing unit 140 superimposing the partial image 212a and the partial image 214b. According to the digital camera 10 of this example, since the output image 220 is generated by superimposing the partial image 212a and the partial image 214b, which are captured at optimal exposure, the whole image having optimal exposure can be obtained.

Figure 10:
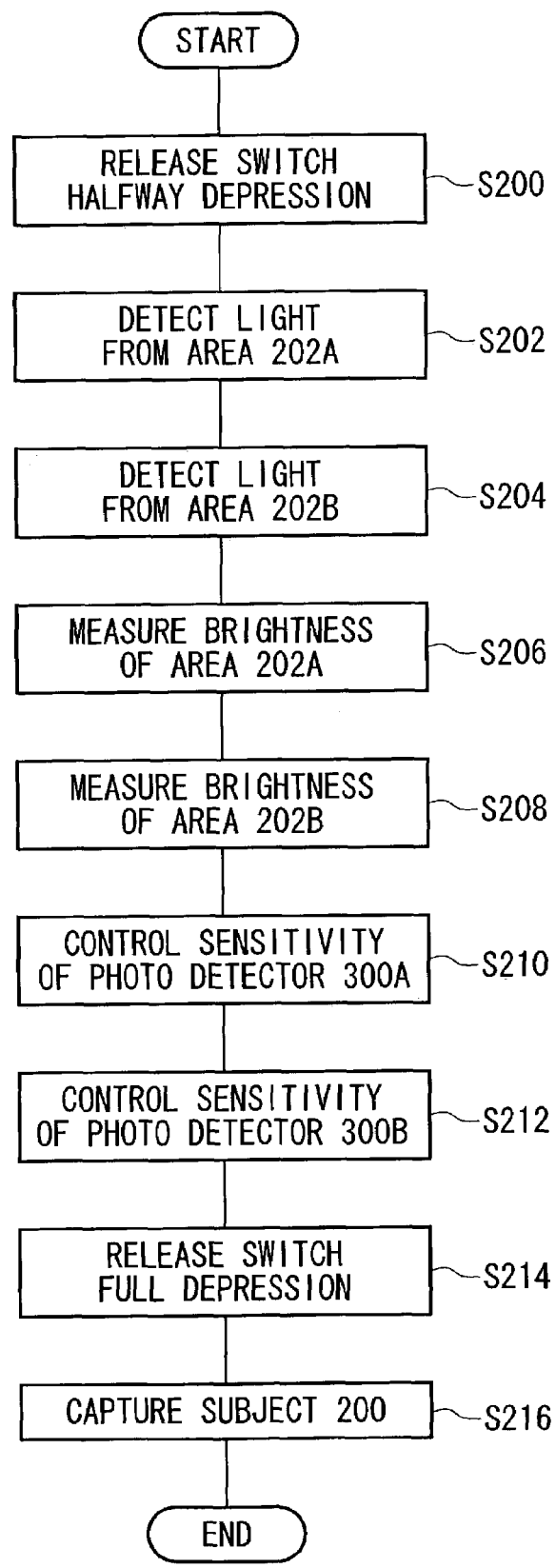
FIG. 10 is a flow chart showing an example of operation of the digital camera according to the present embodiment.

FIG. 10 is an example of a flow chart showing an operation of capturing a subject by the digital camera 10 according to the present embodiment. After the subject 200 is framed, a user depresses a release switch halfway (S200). The photo detector 300a detects light from the area 202a in accordance with the halfway depression of the release switch (S202). Then, the photo detector 300b detects light from the area 202b (S204). The pick-up signal processing unit 32 measures brightness of the area 202a based on an electrical signal outputted from the photo detector 300a (S206) The pick-up signal processing unit 32 measures brightness of the area 202b based on an electrical signal outputted from the photo detector 300b (S208). The sensitivity control unit 11 controls sensitivity of the photo detector 300a based on the brightness of the area 202a measured by the pick-up signal processing unit 32 (S210). The sensitivity control unit 11 controls the sensitivity of the photo detector 300b based on the brightness of the area 202b measured by the pick-up signal processing unit 32 (S212). After the control of the sensitivity of the photo detectors is finished, the digital camera 10 may notify the user about the completion of the control by means of such as sound and light. After the control of the sensitivity of the photo detectors is finished, the user further depresses the release switch fully from the half-depressed position (S214). The image pick-up unit 20 captures a subject 200 in accordance with the full-depression of the release switch (S216). The sequential function flow is ended hereinbefore.

Figure 11:
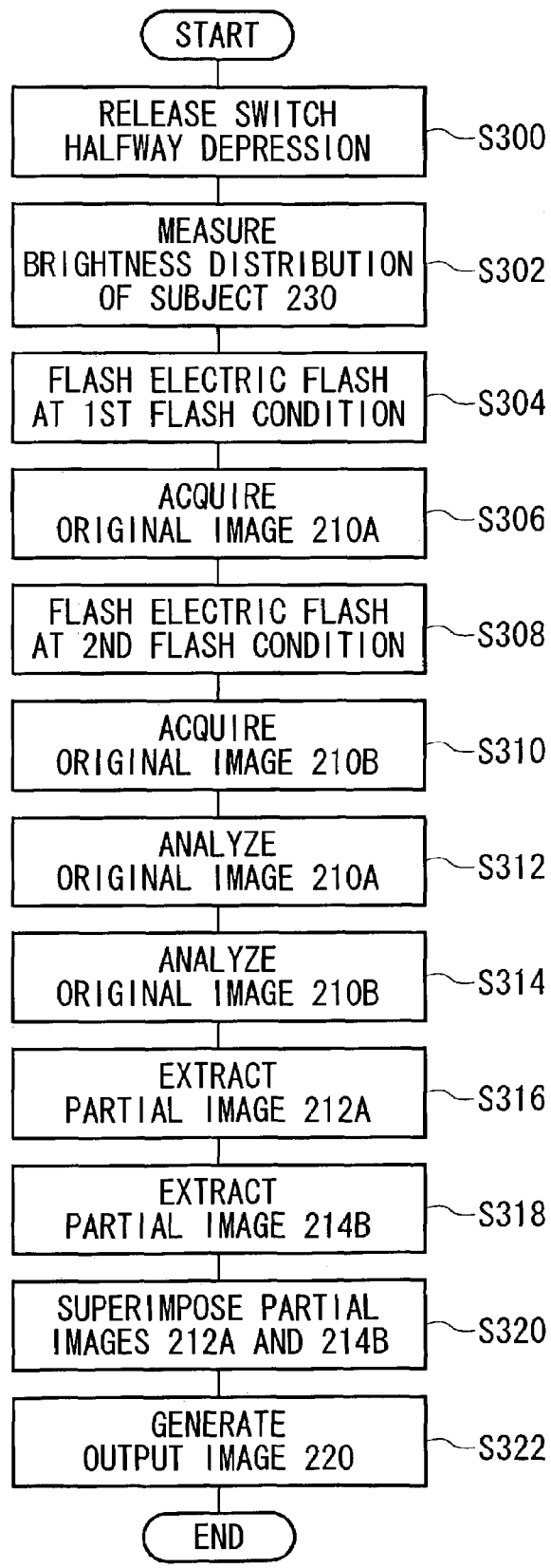
FIG. 11 is a flow chart showing another example of operation of the digital camera according to the present embodiment.

FIG. 11 is another example of a flowchart showing an operation of capturing a subject by the digital camera 10 according to the present embodiment. After the subject 230 is framed, a user depresses a release switch halfway (S300). The photometry sensor 54 measures distribution of brightness of the subject 230 in accordance with the halfway depression of the release switch (S302) Next, the electric flash 36 flashes at a first flash condition suitable for reaching the area 232 based on the distribution of the brightness measured by the photometry sensor 54 (S304) The image pick-up unit 20 captures the subject 230 almost simultaneously with the flash of the electric flash 36, and acquires the original image 210a (S306). Next, the electric flash 36 flashes at a second flash conditions suitable for reaching the area 234 based on the distribution of the brightness measured by the photometry sensor 54 (S308). The image pick-up unit 20 captures the subject 230 almost simultaneously with the flash of the electric flash 36, and acquires the original image 210b (S310). Next, the image processing unit 140 analyzes exposure level of whole area of the original image 210a (S312). The image processing unit 140 analyzes exposure level of whole area of the original image 210b (S314). The image processing unit 140 trims and extracts the partial image 212a, where the area 232 is captured at optimal exposure level, from the original image 210a based on the result of the analysis in S312 (S316). Then the image processing unit 140 trims and extracts the partial image 214b, where the area 234 is captured at optimal exposure level, from the original image 210b based on the result of the analysis in S314 (S318). Next, the image processing unit 140 superimposes the partial image 212a and the partial image 214b (S320), and generates the output image 220 (S322). The sequential function flow is ended hereinbefore.

Figure 12:
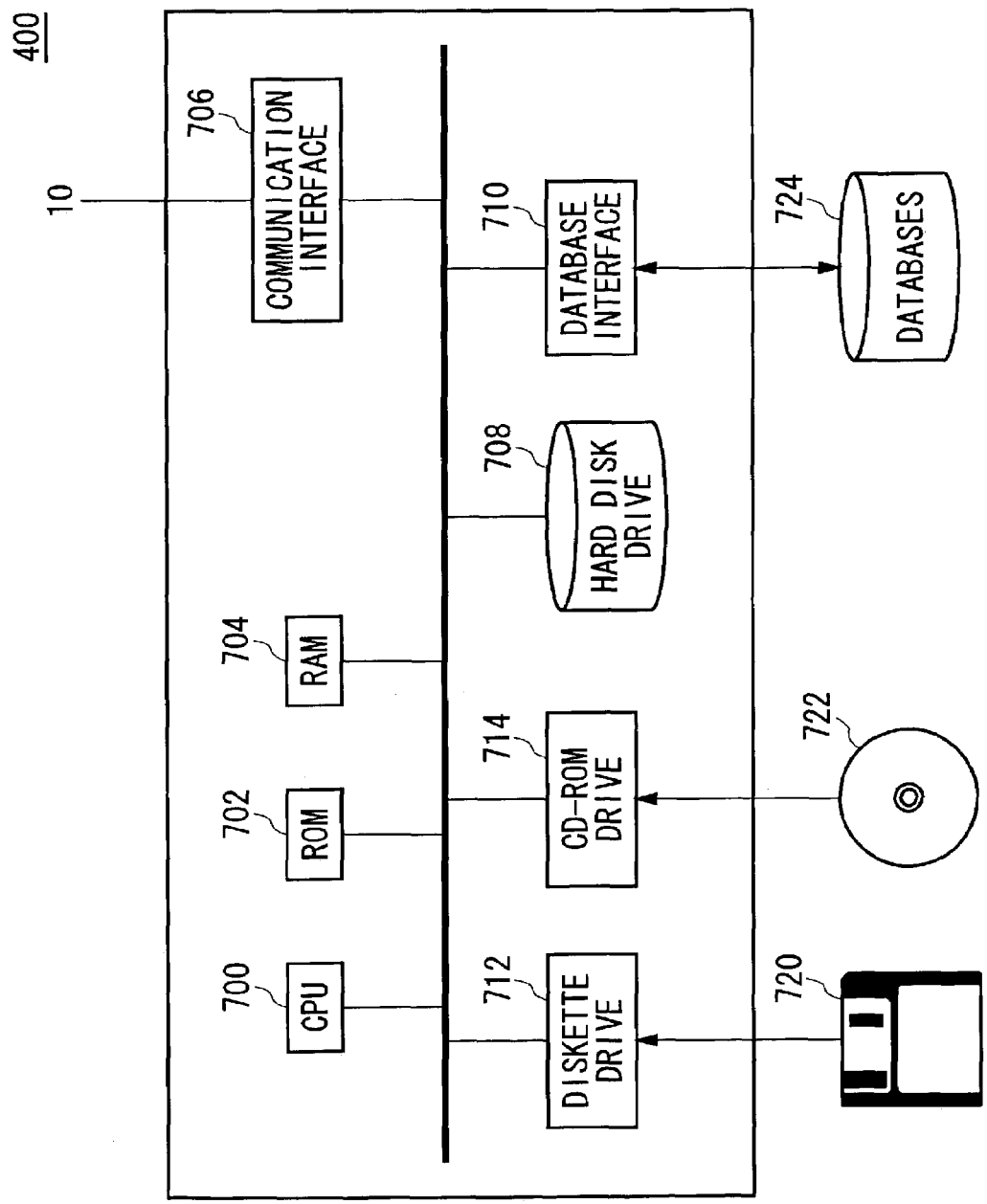
FIG. 12 is a block diagram showing an example of a hardware configuration of a personal computer according to the present embodiment.

FIG. 12 is a block diagram showing a hardware configuration of the personal computer 400 according to the present embodiment. The personal computer 400 includes CPU 700, ROM 702, RAM 704, a communication interface 706, a hard disk drive 708, a database interface 710, a diskette drive 712, and a CD-ROM drive 714. The CPU 700 operates based on a program stored in the ROM 702 and the RAM 704. The communication interface 706 communicates with the digital camera 10 through network. The database interface 710 writes data in a database, and updates the contents of the database. The hard disk drive 708, as an example of a storage device, stores setting information and program executed in the CPU 700.

The diskette drive 712 reads data or a program from a diskette 720, and provides the data or the program to the CPU 700 and the communication interface 706. The CD-ROM drive 714 reads data or a program from CD-ROM 722, and provides the data or the program to the CPU 700 and the communication interface 706. The communication interface 706 transmits the data or the program provided by the diskette drive 712 or the CD-ROM drive 714 to the digital camera 10. The database interface 710 connects with various databases 724, and transmits and receives data to/from the databases 724.

The program, which is executed by the CPU 700 and supplied to the digital camera, is stored in a record medium such as the diskette 720 or the CD-ROM 722 and provided to a user. The program stored in the record medium may be either compressed or decompressed. The program executed by the CPU 700 is installed from the record medium to the hard disk drive 708, read by the RAM 704, and executed by the CPU 700. The program supplied to the digital camera is read from the record medium, installed in the digital camera 10 through the communication interface 706, and executed in the digital camera 10.

The program in the record medium, which is installed in the digital camera 10, includes a brightness measuring module, a sensitivity control module, an image pick-up module, and an image generation module as a functional configuration. Since the function of the modules, by which the digital camera 10 is manipulated, is the same as the operation of the corresponding component in the digital camera 10 of the present embodiment, explanation of the function of the modules is omitted.

A part or all functions of the operation of the digital camera 10 in all embodiments explained in this patent application are storable in the diskette 720 or the CD-ROM 722, which are examples of the record media depicted in FIG. 12.

These programs may be read by the RAM from the record medium and be executed, or may be executed after the programs are installed in the RAM. The programs may be stored either on a single record medium or a plurality of record media. The programs may be stored in an encoded form.

It is possible to use an optical record medium such as DVD or PD, a magneto-optical record medium such as Minidisk, a tape medium, a magnetic record medium or a semiconductor memory such as an IC card or a Miniature Card as a record medium instead of the diskette or the CD-ROM. A storage device, such as a hard disk or RAM in a server system on a dedicated communication network or the Internet, may be used as a record medium and the program may be provided to the digital camera 10 via the communication network.

Figure 13:
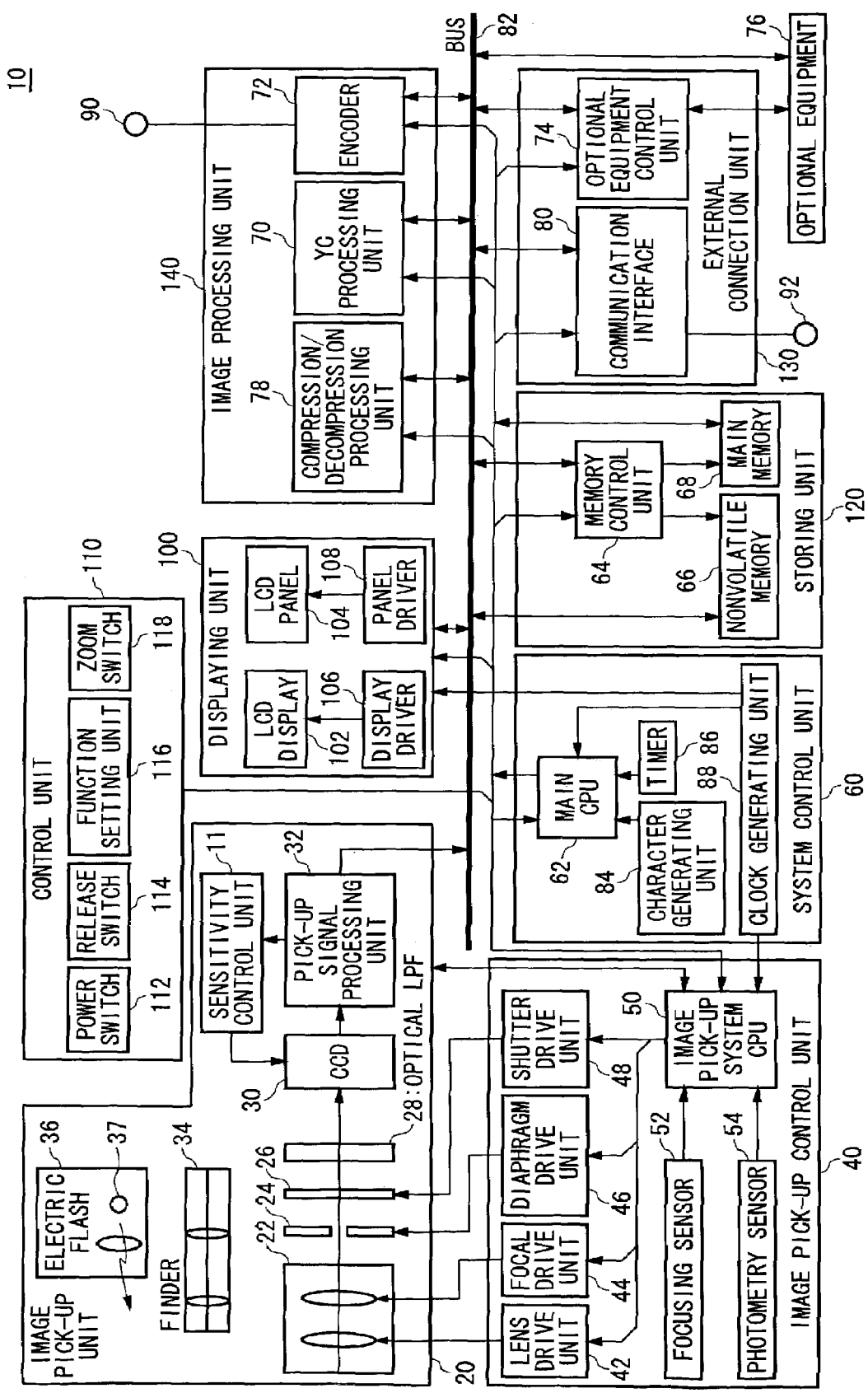
FIG. 13 is a block diagram showing an example of a detailed configuration of the digital camera according to the present embodiment.

FIG. 13 is a block diagram showing an example of a configuration of the digital camera 10 according to the present embodiment. The digital camera 10 includes the image pick-up unit 20, an image pick-up control unit 40, a system control unit 60, a displaying unit 100, a control unit 110, the storing unit 120, an external connection unit 130 and the image processing unit 140.

The image pick-up unit 20 includes a taking-lens unit 22, a diaphragm 24, a shutter 26, optical LPF 28 (low pass filter), the CCD 30 (charge-coupled device), the pick-up signal processing unit 32, a finder 34, and the electric flash 36.

The taking-lens unit 22 takes and processes a subject image. The taking-lens unit 22 includes a focal lens, a zoom lens, etc., and forms the image of the subject onto surface of the CCD 30. The diaphragm 24 limits the light which passes the taking-lens unit 22, and the optical LPF 28 passes light having longer wavelength component than a predetermined wavelength. Each of the photo detectors 300 included in the CCD 30 stores charge according to quantity of light of the formed subject image (the charge is referred to as "stored charge" hereinafter).

The shutter 26 is a mechanical shutter and controls whether to form the image of the light onto the CCD 30, the light passing the taking-lens unit 22. The digital camera 10 may include an electronic shutter function instead of the mechanical shutter 26. In order to realize the electronic shutter function, each of the photo detectors 300 of the CCD 30 has a shutter gate and a shutter drain. The stored charge is discharged to the shutter drain by turning on the shutter gate. Duration of storing the charge to each of the photo detectors 300, i.e., shutter speed, is controllable by controlling the shutter gate. In the CCD 30, the stored charge is read by a shift register by applying a readout gate pulse, and is read sequentially as a voltage signal by applying the register transfer pulse.

The pick-up signal processing unit 32 separates the voltage signal indicating the subject image outputted from the CCD 30, i.e., an analog signal, into R, G, and B components. The pick-up signal processing unit 32 adjusts white balance of the subject image by adjusting R, G, and B components. The pick-up signal processing unit 32 performs gamma correction of the subject image. The pick-up signal processing unit 32 converts the analog signal, which is separated into R, G, and B components, to a digital signal, and image data of the digital signal of the subject image (referred to as "digital image data" hereinafter), obtained by the A/D conversion, is outputted to the system control unit 60.

The finder 34 may have a displaying means and may display various information from below-mentioned main CPU 62, etc. The electric flash 36 includes a discharge tube 37, which discharges energy stored in a capacitor, and when the energy is supplied to the discharge tube 37, the electric flash 36 functions by the discharge tube 37 emitting light.

The image pick-up control unit 40 includes a lens drive unit 42, a focal drive unit 44, a diaphragm drive unit 46, a shutter drive unit 48, an image pick-up system CPU 50 which controls the drive units above, a focusing sensor 52, and the photometry sensor 54. The lens drive unit 42, the focal drive unit 44, the diaphragm drive unit 46, and the shutter drive unit 48 include driving means, such as a stepping motor, and drive mechanical components in the image pick-up unit 20. According to depression of a below-mentioned release switch 114, the focusing sensor 52 measures distance to the subject, and the photometry sensor 54 measures brightness of the subject. The focusing sensor 52 and the photometry sensor 54 supply focusing data and photometry data to the image pick-up system CPU 50, where the focusing data means the data of the measured distance to the subject, and the photometry data means the data of the measured brightness of the subject.

The image pick-up system CPU 50 controls the lens drive unit 42 and the focal drive unit 44, and adjusts a zoom magnification and a focus of the taking-lens 22 based on photography information, such as a zoom magnification directed by a user. Alternatively, the image pick-up system CPU 50 may control the lens drive unit 42 and the focal drive unit 44, and may adjust a zoom magnification and a focus based on the focusing data received from the focusing sensor 52.

The image pick-up system CPU 50 determines stop and shutter speed based on the photometry data received from the photometry sensor 54. The diaphragm drive unit 46 and the shutter drive unit 48 control the aperture size of the diaphragm 24, and the opening and closing of the shutter 26 in accordance with the determined value.

The image pick-up system CPU 50 controls light emission of the electric flash 36 based on the photometry data received from the photometry sensor 54, and adjusts the aperture size of the diaphragm 26 simultaneously. When the user instructs to take an image, the CCD 30 starts to store the charge and outputs the stored charge to the pick-up signal processing unit 32 after the shutter time calculated from the photometry data is elapsed.

The system control unit 60 includes main CPU 62, a character generating unit 84, a timer 86, and a clock generating unit 88. The main CPU 62 controls whole parts of the digital camera 10, especially the system control unit 60. The main CPU 62 sends and receives required information to/from the image pick-up systems CPU 50 by serial communication or the like.

The clock generating unit 88 generates an internal clock of the main CPU 62, and supplies it to the main CPU 62. The clock generating unit 88 also generates internal clocks of the image pick-up system CPU 50 and the displaying unit 100. The clock generating unit 88 may supply the clocks having different frequencies to the main CPU 62, the image pick-up system CPU 50, and the displaying unit 100, respectively.

The character generating unit 84 generates text and graphic information, which is superimposed onto the captured image, such as date/time or a title of the image. A timer 86 has backing of battery etc., counts time always, and supplies time information, such as information about the captured date/time of the captured image, to the main CPU 62 based on the counted value. It is preferable that the power is supplied to the timer 86 from the battery so as to count time even when main power supply of the digital camera is switched off. It is also preferable that the character generating unit 84 and the timer 86 are annexed to the main CPU 62.

The storing unit 120 includes a memory control unit 64, nonvolatile memory 66, and main memory 68. The memory control unit 64 controls the nonvolatile memory 66 and the main memory 68. The nonvolatile memory 66 is composed of EEPROM (electrically erasable programmable read only memory) or flash memories etc., and stores it with data which is to be held even when the power supply of the digital camera 10 is switched off, such as setting information set by a user or a factory preset value. The nonvolatile memory 66 may store a boot program, a system program, etc. of the main CPU 62.

It is preferable that the main memory 68 is composed of memory which is relatively inexpensive and has large capacity, like DRAM. The main memory 68 has a function as frame memory to store the data outputted from the image pick-up unit 20, a function as system memory which loads various programs, and a function as a work area. The nonvolatile memory 66 and the main memory 68 communicate with each part inside/outside the system control unit 60 through a bus 82. The nonvolatile memory 66 may further store the digital image data.

The image processing unit 140 includes an YC processing unit 70, an encoder 72, and a compression/decompression processing unit 78. The external connection unit 130 includes an optional equipment control unit 74 and a communication interface 80.

The YC processing unit 70 performs YC conversion to the digital image data, and generates a luminance signal Y, a color difference signals B-Y and R-Y. The main memory 68 stores the luminance signal and the color difference signals based on control of the memory control unit 64.

The compression/decompression processing unit 78 reads the luminance signal and the color difference signals sequentially from the main memory 68, and compresses them. Then the optional equipment control unit 74 writes the compressed digital image data (referred to as "compressed data") in a memory card which is an example of the optional equipment 76.

The encoder 72 converts the luminance signal and the color difference signals into a video signal (such as NTSC or PAL signal), and outputs the video signal from a terminal 90. When generating the video signal from the compressed data recorded on the optional equipment 76, the compressed data is supplied to the compression/decompression processing unit 78 at first through the optional equipment control unit 74. Then, the data is decompressed in the compression/decompression processing unit 78 and the encoder 72 converts the decompressed data into the video signal.

The optional equipment control unit 74 performs generation, logical conversion, and/or voltage conversion of the signal that flows between the bus 82 and the optional equipment 76, in order to conform the signal to the specification of the optional equipment 76 and the bus 82. Other than the above-mentioned memory card, the digital camera 10 may support a standard PCMCIA I/O card, for example, as the optional equipment 76. In this case, the optional equipment control unit 74 may be composed of bus control LSI for PCMCIA standard or the like.

The communication interface 80 performs control such as protocol conversion to comply with the communication specification supported by the digital camera 10, e.g., USB, RS-232C, Ethernet, etc. The communication interface 80 may output the compressed data or the digital image data to external equipment or to a network through a terminal 92. The communication interface 80 includes a driver IC if necessary and communicates with external equipment through the terminal 92. The communication interface 80 may be adapted to communicate with the external equipment, such as a printer, a Karaoke machine or a video game machine, through an original standard interface.

The displaying unit 100 includes an LCD display 102, an LCD panel 104, a display driver 106, and a panel driver 108. The display driver 106 controls the LCD display 102. The panel driver 108 controls the LCD panel 104. The LCD display 102 is positioned on the back face of the camera, of which the size is about 2 inches for example, and displays an image currently captured, a playback image, zoom magnification of the captured or playback image, remaining battery charge, date/time, mode selection screen, a subject image, etc. The LCD panel 104 is a monochrome LCD, for example, is positioned on top face of the camera, and displays information, such as quality of the image (fine, normal, basic, etc.), flash mode (forced flash, suppressed flash, etc), number of available frames, number of pixels, and remaining battery charge.

The control unit 110 includes a power switch 112, a release switch 114, a function setting unit 116, and a zoom switch 118. The power switch 112 switches the digital camera 10 on and off based on direction of a user. The release switch 114 can be depressed in two levels, i.e., halfway depression and full depression. For example, when the release switch 114 is depressed halfway, the image pick-up control unit 40 performs automatic focusing and automatic exposure, and the image pick-up unit 20 captures a subject image by depressing the release switch 114 fully.

The function setting unit 116 is, for example, a rotatable mode dial or a 4-direction button and accepts settings such as "file format", "special effect", "print", "determine/save", "change display ", etc. The zoom switch 118 accepts setting of zoom magnification of the subject image captured by the image pick-up unit 20.

The digital camera 10 having the above-mentioned structure operates in the following manner. First, the power switch 112 is depressed and power is supplied to each part of the digital camera 10. The main CPU 62 judges whether the digital camera 10 is in photography mode or in playback mode by reading status of the function setting unit 116.

When a digital camera 10 is in photography mode, the main CPU 62 supervises the depression status of the release switch 114. When the half-depression of the release switch 114 is detected, the image pick-up system CPU 50 acquires photometry data and focusing data from the photometry sensor 54 and the focusing sensor 52, respectively. The image pick-up control unit 40 adjusts focus and stop of the image pick-up unit 20, etc. based on the photometry data and the focusing data acquired by the image pick-up system CPU 50. After the adjustment, the LCD display 102 informs a user about the completion of the adjustment by displaying characters, such as "standby".

Then, the main CPU 62 supervises the depression status of the release switch 114. When the full-depression of the release switch 114 is detected, the shutter 26 is closed after a predetermined shutter time is elapsed and the stored charge of the CCD 30 is discharged to the pick-up signal processing unit 32. The digital image data, generated as a result of processing by the pick-up signal processing unit 32, is outputted to the bus 82. The digital image data is once stored in the main memory 68, then it is processed in the YC processing unit 70 and the compression/decompression processing unit 78, and is recorded in the optional equipment 76 via the optional equipment control unit 74. The captured image based on the recorded digital image data is displayed on the LCD display 102 for a while, so that a user can check the captured image. As described above, a sequence of the photographing operation is finished.

On the other hand, when the digital camera 10 is in playback mode, the main CPU 62 reads the captured image from the main memory 68, the nonvolatile memory 66, and/or the optional equipment 76, and displays the image on the LCD display 102 of the displaying unit 100.

In this state, when a user directs either "move forward" or "move backward" on the function setting unit 116, the main CPU 62 reads another captured image stored in the main memory 68, the nonvolatile memory 66, and/or the optional equipment 76, and displays the image on the LCD display 102 of the displaying unit 100.

As described above, the present invention provides the image capturing apparatus which obtains images having high dynamic range.

Although the present invention has been described by way of an exemplary embodiment, it should be understood that those skilled in the art might make many changes and substitutions without departing from the spirit and the scope of the present invention which is defined only by the appended claims.

What is claimed is:

1. An image capturing apparatus for capturing a subject, comprising:

an image sensing device comprising a first photo detector for detecting light of a first area of the subject, and a second photo detector for detecting light of a second area of the subject;

a brightness measuring unit for measuring brightness of the first area, and brightness of the second area; and a sensitivity control unit for controlling sensitivity of said first photo detector based on the brightness of the first area measured by said brightness measuring unit, and controlling sensitivity of said second photo detector based on the brightness of the second area measured by said brightness measuring unit, wherein said first photo detector comprises a first micro lens for condensing light, and a first exposure unit for detecting the light condensed by said first micro lens, said second photo detector comprises a second micro lens for condensing light, and a second exposure unit for detecting the light condensed by said second micro lens, and said sensitivity control unit controls relative position between said first micro lens and said first exposure unit based on the brightness of the first area measured by said brightness measuring unit, and controls relative position between said second micro lens and said second exposure unit based on the brightness of the second area measured by said brightness measuring unit.

2. The image capturing apparatus as claimed in claim 1, wherein the first area in the subject comprises a main subject, and wherein a ratio of a sensitivity level of the first photo detector to that of the second photo detector is a value such that an output image having a higher dynamic range than a dynamic range of the photo detectors is obtained.

3. The image capturing apparatus as claimed in claim 2, wherein said image sensing device farther comprises a plurality of said first photo detectors adjoining mutually, and a plurality of said second photo detectors adjoining mutually, which are located outside of said plurality of said first photo detectors in an exposure area of said image sensing device.

4. The image capturing apparatus as claimed in claim 2, wherein a proportion of light irradiated on said first exposure unit to light irradiated on said first photo detector is defined as a first proportion, and wherein a proportion of light irradiated on said second exposure unit to light irradiated on said second photo detector is defined as a second proportion.

5. The image capturing apparatus as claimed in claim 4, wherein a relative position between said first exposure unit and said first micro lens is different from a relative position between said second exposure unit and said second micro lens.

6. The image capturing apparatus as claimed in claim 4, wherein a focal length of said first micro lens is different from a focal length of said second micro lens.

7. The image capturing apparatus as claimed in claim 1, wherein the second area in the subject does not comprise the main subject, and wherein a ratio of a sensitivity level of the first photo detector to that of the second photo detector is a value such that an output image having a higher dynamic range than a dynamic range of the photo detectors is obtained.

8. The image capturing apparatus as claimed in claim 1, wherein the first area in the subject comprises a main subject, and the second area in the subject does not comprise the main subject, and wherein a ratio of a sensitivity level of the first photo detector to that of the second photo detector is a value such that an output image having a higher dynamic range than a dynamic range of the photo detectors is obtained.

9. The image capturing apparatus as claimed in claim 1, wherein in a case of using an electronic flash, an amount of light falling on the first photo detector per unit area is larger than that of the light falling on the second photo detector per unit area, wherein (a) the first area in the subject comprises a main subject, and the second area in the subject does not comprise the main subject, and (b) a ratio of a sensitivity level of the first photo detector to that of the second photo detector is a value such that overexposure of the main subject is preventable and the second photo detector captures the subject at proper exposure.

10. The image capturing apparatus as claimed in claim 1, wherein in a case of using an electronic flash, an amount of light falling on the first photo detector per unit area is larger than that of the light falling on the second photo detector per unit area, and wherein (a) the first area in the subject comprises a main subject, and the second area in the subject does not comprise the main subject, and (b) a ratio of a sensitivity level of the first photo detector to that of the second photo detector is a value such that overexposure of the main subject is preventable and the second photo detector captures the subject at proper exposure, and (c) a ratio of sensitivity level of the first photo detector to that of the second photo detector is based on a distribution characteristic of the electronic flash.

11. The image capturing apparatus as claimed in claim 1, further comprising a semiconductor substrate on which said first photo detector and said second photo detector are positioned.

12. An image capturing apparatus for capturing a subject, comprising:
   an image sensing device comprising a first photo detector for detecting light of a first area of the subject, and a second photo detector for detecting light of a second area of the subject;
   a brightness measuring unit for measuring brightness of the first area, and brightness of the second area; and
   a sensitivity control unit for controlling sensitivity of said first photo detector based on the brightness of the first area measured by said brightness measuring unit, and controlling sensitivity of said second photo detector based on the brightness of the second area measured by said brightness measuring unit,
   wherein said first photo detector comprises a first micro lens for condensing light,
   said second photo detector comprises a second micro lens for condensing light, and
   said sensitivity control unit controls focal length of said first micro lens based on the brightness of the first area measured by said brightness measuring unit, and controls focal length of said second micro lens based on the brightness of the second area measured by said brightness measuring unit.

13. An image capturing method for capturing a subject, comprising steps of:
   detecting light of a first area of the subject by a first photo detector;
   detecting light of a second area of the subject by a second photo detector;
   measuring brightness of the first area, and brightness of the second area; and
   controlling sensitivity of the first photo detector based on the brightness of the first area measured in said brightness measuring step, and controlling sensitivity of the second photo detector based on the brightness of the second area measured in said brightness measuring step,
   wherein said first photo detector comprises a first micro lens for condensing light, and a first exposure unit for detecting the light condensed by said first micro lens,
   said second photo detector comprises a second micro lens for condensing light, and a second exposure unit for detecting the light condensed by said second micro lens, and
   said sensitivity control unit controls relative position between said first micro lens and said first exposure unit based on the brightness of the first area measured by said brightness measuring unit, and controls relative position between said second micro lens and said second exposure unit based on the brightness of the second area measured by said brightness measuring unit.

14. A computer readable medium storing thereon a program for an image capturing apparatus which captures a subject, the program comprising:
   a brightness measuring module for allowing the image capturing apparatus to measure brightness of a first area, and brightness of a second area; and
   a sensitivity control module for allowing the image capturing apparatus to control sensitivity of a first photo detector for detecting light from the first area based on the brightness of the first area measured by said brightness measuring module, and to control sensitivity of a second photo detector for detecting light from the second area based on the brightness of the second area measured by said brightness measuring module,
   wherein said first photo detector comprises a first micro lens for condensing light, and a first exposure unit for detecting the light condensed by said first micro lens,
   said second photo detector comprises a second micro lens for condensing light, and a second exposure unit for detecting the light condensed by said second micro lens, and
   said sensitivity control module controls relative position between said first micro lens and said first exposure unit based on the brightness of the first area measured by said brightness measuring module, and controls relative position between said second micro lens and said second exposure unit based on the brightness of the second area measured by said brightness measuring module.

15. An image capturing method for capturing a subject, comprising steps of:
   detecting light of a first area of the subject by a first photo detector;
   detecting light of a second area of the subject by a second photo detector;
   measuring brightness of the first area, and brightness of the second area; and
   controlling sensitivity of the first photo detector based on the brightness of the first area measured in said brightness measuring step, and controlling sensitivity of the second photo detector based on the brightness of the second area measured in said brightness measuring step,
   wherein said first photo detector comprises a first micro lens for condensing light,
   said second photo detector comprises a second micro lens for condensing light, and
   said sensitivity control unit controls focal length of said first micro lens based on the brightness of the first area measured by said brightness measuring unit, and controls focal length of said second micro lens based on the brightness of the second area measured by said brightness measuring unit.

16. A computer readable medium storing thereon a program for an image capturing apparatus which captures a subject, the program comprising:
   a brightness measuring module for allowing the image capturing apparatus to measure brightness of a first area, and brightness of a second area; and
   a sensitivity control module for allowing the image capturing apparatus to control sensitivity of a first photo detector for detecting light from the first area based on the brightness of the first area measured by said brightness measuring module, and to control sensitivity of a second photo detector for detecting light from the second area based on the brightness of the second area measured by said brightness measuring module,
   wherein said first photo detector comprises a first micro lens for condensing light, said second photo detector comprises a second micro lens for condensing light, and said sensitivity control module controls focal length of said first micro lens based on the brightness of the first area measured by said brightness measuring module, and controls focal length of said second micro lens based on the brightness of the second area measured by said brightness measuring module.

* * * * *